(12) United States Patent
Serebrin

(10) Patent No.: US 10,693,850 B2
(45) Date of Patent: Jun. 23, 2020

(54) MANAGING NIC-ENCRYPTED FLOWS FOR MIGRATING GUESTS OR TASKS

(71) Applicant: Google Inc., Mountain View, CA (US)

(72) Inventor: Benjamin Charles Serebrin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 14/708,685

(22) Filed: May 11, 2015

(65) Prior Publication Data

US 2015/0326542 A1    Nov. 12, 2015

Related U.S. Application Data

(60) Provisional application No. 61/991,784, filed on May 12, 2014.

(51) Int. Cl.
*H04L 29/06* (2006.01)
*H04L 9/08* (2006.01)
*G06F 9/455* (2018.01)

(52) U.S. Cl.
CPC ............ *H04L 63/045* (2013.01); *G06F 9/455* (2013.01); *G06F 9/45558* (2013.01);
(Continued)

(58) Field of Classification Search
CPC . H04L 63/045; H04L 9/0822; H04L 63/0428; H04L 63/61; G06F 9/45558; G06F 2009/4557; G06F 2009/45587
(Continued)

(56) References Cited

U.S. PATENT DOCUMENTS 5,748,738 A * 5/1998 Bisbee ................ G06Q 20/00
380/30
6,574,733 B1 * 6/2003 Langford ............. G06F 21/606
713/193

(Continued)

FOREIGN PATENT DOCUMENTS

CN        101984631 A      3/2011
CN        102163266 A      8/2011
(Continued)

OTHER PUBLICATIONS

Kassner, M., "Next Generation Firewalls: It's all about tuples", IT Security, Nov. 28, 2011. pp. 1-6.*
(Continued)

*Primary Examiner* — Tongoc Tran
(74) *Attorney, Agent, or Firm* — Lerner, David, Littenberg, Krumholz & Mentlik, LLP

(57) ABSTRACT

An example of a system and method implementing a live migration of a guest on a virtual machine of a host server to a target server is provided. For example, a host server may utilize a flow key to encrypt and decrypt communications with a target server. This flow key may be encrypted using a receive master key, which may result in a receive token. The receive token may be sent to the Network Interface Controller of the host server, which will then encrypt the data packet and forward the information to the target server. Multiple sender schemes may be employed on the host server, and various updates may take place on the target server as a result of the new location of the migrating guest from the host server to the target server.

13 Claims, 8 Drawing Sheets

(52) U.S. Cl.
CPC ........ *H04L 9/0822* (2013.01); *H04L 63/0428* (2013.01); *G06F 2009/4557* (2013.01); *G06F 2009/45587* (2013.01); *H04L 63/061* (2013.01); *H04L 2463/062* (2013.01)

(58) Field of Classification Search
USPC ...................................................... 713/160
See application file for complete search history.

(56) References Cited

U.S. PATENT DOCUMENTS

| | | | | |
|---|---|---|---|---|
| 6,912,655 | B1* | 6/2005 | Zucker | H04L 9/065 380/277 |
| 6,986,046 | B1* | 1/2006 | Tuvell | G06F 21/6218 380/283 |
| 7,412,059 | B1* | 8/2008 | Pauker | H04L 12/58 380/277 |
| 7,802,001 | B1* | 9/2010 | Petry | G06F 15/16 709/223 |
| 8,745,185 | B1* | 6/2014 | Salo | H04L 63/0428 709/223 |
| 8,854,972 | B1* | 10/2014 | Li | H04L 47/12 370/235 |
| 9,258,271 | B1* | 2/2016 | Anderson | H04L 61/2517 |
| 2002/0143885 | A1* | 10/2002 | Ross, Jr. | G06Q 10/107 709/207 |
| 2003/0039358 | A1* | 2/2003 | Scheidt | H04L 9/0869 380/277 |
| 2003/0142364 | A1* | 7/2003 | Goldstone | H04L 63/0435 358/402 |
| 2004/0062399 | A1* | 4/2004 | Takase | H04L 63/062 380/277 |
| 2004/0125957 | A1* | 7/2004 | Rauber | H04L 65/607 380/259 |
| 2005/0039034 | A1* | 2/2005 | Doyle | H04L 9/0825 713/193 |
| 2007/0027812 | A1* | 2/2007 | Ogawa | G06F 21/10 705/57 |
| 2007/0073879 | A1* | 3/2007 | Overby, Jr. | H04L 63/0236 709/225 |
| 2007/0185982 | A1* | 8/2007 | Nakanowatari | G06F 21/10 709/223 |
| 2008/0052781 | A1* | 2/2008 | Bogot | H04L 63/0428 726/26 |
| 2010/0265949 | A1* | 10/2010 | Cervantes | H04L 47/10 370/392 |
| 2010/0332456 | A1* | 12/2010 | Prahlad | G06F 3/0649 707/664 |
| 2011/0099318 | A1* | 4/2011 | Hudzia | G06F 9/45533 711/6 |
| 2011/0202765 | A1* | 8/2011 | McGrane | G06F 21/53 713/168 |
| 2012/0017031 | A1* | 1/2012 | Mashtizadeh | G06F 9/45558 711/6 |
| 2012/0084570 | A1* | 4/2012 | Kuzin | G06F 21/41 713/182 |
| 2012/0114119 | A1* | 5/2012 | Ahuja | H04L 63/0853 380/44 |
| 2012/0130936 | A1* | 5/2012 | Brown | G06N 5/048 706/52 |
| 2012/0151476 | A1* | 6/2012 | Vincent | G06F 9/45558 718/1 |
| 2012/0173866 | A1* | 7/2012 | Ashok | G06F 21/575 713/150 |
| 2012/0179909 | A1* | 7/2012 | Sagi | H04L 63/045 713/167 |
| 2013/0061047 | A1* | 3/2013 | Sridharan | H04L 45/586 713/162 |
| 2013/0191648 | A1* | 7/2013 | Bursell | G06F 9/4856 713/189 |
| 2013/0243197 | A1* | 9/2013 | Sherwood | H04L 9/08 380/277 |
| 2013/0283362 | A1* | 10/2013 | Kress | G06F 21/44 726/7 |
| 2014/0007092 | A1* | 1/2014 | Barbee | G06F 9/4856 718/1 |
| 2014/0033201 | A1* | 1/2014 | Dawkins | G06F 11/1484 718/1 |
| 2014/0115175 | A1* | 4/2014 | Lublin | G06F 9/4856 709/228 |
| 2014/0201302 | A1* | 7/2014 | Dube | G06F 12/084 709/212 |
| 2014/0208111 | A1* | 7/2014 | Brandwine | H04L 63/0428 713/171 |
| 2014/0215561 | A1* | 7/2014 | Roberson | H04L 63/08 726/3 |
| 2014/0281509 | A1* | 9/2014 | Angelo | G06F 21/602 713/164 |
| 2014/0289728 | A1* | 9/2014 | Mitsunobu | G06F 9/45558 718/1 |
| 2014/0297979 | A1* | 10/2014 | Baron | G06F 3/0647 711/162 |
| 2014/0331058 | A1* | 11/2014 | Heyner | G06F 21/602 713/185 |
| 2015/0067330 | A1* | 3/2015 | Khan | H04L 9/3013 713/168 |
| 2015/0088586 | A1* | 3/2015 | Pavlas | G06F 9/45558 705/7.25 |
| 2015/0089010 | A1* | 3/2015 | Tsirkin | G06F 12/126 709/212 |
| 2015/0146539 | A1* | 5/2015 | Mehta | H04L 47/125 370/237 |
| 2015/0212846 | A1* | 7/2015 | Tsirkin | G06F 9/45558 711/114 |
| 2015/0242159 | A1* | 8/2015 | Tsirkin | G06F 3/0647 711/162 |
| 2015/0254441 | A1* | 9/2015 | Sanso | G06F 21/41 726/9 |

FOREIGN PATENT DOCUMENTS

| | | |
|---|---|---|
| CN | 103051510 A | 4/2013 |
| WO | 2004027622 A2 | 4/2004 |
| WO | 2013090035 A1 | 6/2013 |

OTHER PUBLICATIONS

International Search Report and Written Opinion for Application No. PCT/US2015/030193 dated Aug. 18, 2015.
International Preliminary Report on Patentability for PCT Application No. PCT/US2015/030193 dated Nov. 24, 2016.
Notification of First Office Action for Chinese Patent Application No. 201580022858.0 dated Jan. 30, 2019.
Notification of the Second Office Action for Chinese Patent Application No. 201580022858.0 dated Jul. 3, 2019.

* cited by examiner

MANAGING NIC-ENCRYPTED FLOWS FOR MIGRATING GUESTS OR TASKS

CROSS-REFERENCE TO RELATED APPLICATIONS

The present application claims the benefit of the filing date of U.S. Provisional Application No. 61/991,784, filed May 12, 2014, entitled MANAGING NIC-ENCRYPTED FLOWS FOR MIGRATING GUESTS OR TASKS, the disclosure of which is hereby incorporated herein by reference.

BACKGROUND

The migration of guests on Virtual Machines (VMs) from a host server to a target server may affect more than the location of the data, but the various external computing devices that interact with the guests and servers as well. Advances in technology have addressed some issues associated with naïve migration, which could effectively pause guest performance until migration is complete. In this regard, brownout and blackout phases may be employed to reduce the pause time of the guest so that the only pause is during the blackout phase to transfer the dirty pages. If encryption is employed among the various servers and computing devices, then each server and computing device may need to know the different encryption and decryption keys associated with the target server.

SUMMARY

Aspects of the disclosure provide a computer implemented system and method. The method includes preparing, using one or more processors, to send information to a target computing device, the information including at least a flow key and a first data packet of a plurality of data packets; generating, using the one or more processors, a receive token by encrypting the flow key using a receive master key; encrypting the first data packet using the flow key; and sending the encrypted first data packet and receive token to the target computing device.

In an additional example, the method includes sending the information to a network adapter; storing, on the network adapter, the information and the receive token as a tuple, the tuple corresponding to a flow ID; and sending the receive token, flow key, first data packet, and encapsulation information as a tuple to the target server. In another example, the method may include generating a send token by encrypting the receive master key, flow key, and first data packet using a send master key, wherein the send token encapsulates the receive master key, flow key, and first data packet; sending the send token to a network adapter; and decrypting, on the network adapter, the receive master key, flow key, and data packet. In that example, the method may further include retrieving a send token from a first table; copying the retrieved send token in a second table; and sending the copied send token to the network adapter. In a further example, the first and second tables include a reliability number, the reliability number corresponding to the send token, and the method further comprising: updating the send token associated with the first table; incrementing the reliability number associated with the send token of the first table in response to the update. Moreover, in this example the method may further include checking the reliability number corresponding to the send token in the first table before copying the send token in a second table; storing the reliability number in the second table; verifying, after copying the send token, the reliability number corresponding to the send token is the same in the first and second tables; and when the reliability number is not the same, retrieving the send token again. Even more so, the method may further include sending the copied send token to the network adapter when the reliability number is the same. As another example, the method includes receiving, at a target computing device, the encrypted first data packet and receive token; decrypting the receive token using the receive master key; identifying the flow key in response to decrypting the receive token; and decrypting the first data packet using the identified flow key.

Another aspect of the disclosure provides a system comprising a host computing device. The host computing device may include memory and one or more processors configured to prepare information for sending to a target computing device, the information including at least a flow key and a first data packet of a plurality of data packets; generate a receive token by encrypting the flow key using a receive master key; encrypt the first data packet using the flow key; and send the encrypted first data packet and receive token to the target computing device.

As another example, the one or more processors of the host device may send the information to a network adapter; store, on the network adapter, the information and the receive token as a tuple, the tuple corresponding to a flow ID; and send the receive token, flow key, first data packet, and encapsulation information as a tuple to the target server. As another example, the system may generate a send token by encrypting the receive master key, flow key, and first data packet using a send master key, wherein the send token encapsulates the receive master key, flow key, and first data packet; send the send token to the network adapter; and decrypt, on the network adapter, the receive master key, flow key, and data packet. In that example, the system may further The receive a send token from a first table; copy the retrieved send token in a second table; and send the copied send token to the network adapter. In a further embodiment of that example, the first and second tables include a reliability number, the reliability number corresponding to the send token, and the one or more processors are further configured to: update the send token associated with the first table; increment the reliability number associated with the send token of the first table in response to the update. As an additional example, the system may check the reliability number corresponding to the send token in the first table before copying the send token in a second table; store the reliability number in the second table; verify, after copying the send token, the reliability number corresponding to the send token is the same in the first and second tables; and when the reliability number is not the same, retrieve the send token again. In the opposite scenario of the previous example, the system may send the copied send token to the network adapter when the reliability number is the same. Finally, as another example the system may receive, at a target computing device, the information and the receive token; decrypt the receive token using the receive master key; identify the flow key in response to decrypting the receive token; and decrypt the first data packet using the identified flow key.

Another aspect of the disclosure provides a system comprising a target computing device. The target computing device may include memory and one or more processors in communication with the memory. The one or more processors may be configured to receive a receive token and an encrypted data packet from a host computing device decrypt the receive token using the receive master key; identify a flow key in response to decrypting the receive token; and decrypt the data packet using the identified flow key.

In a further example, the one or more processors of the target computing may be further configured to send an indication to an external computer of a migration of a guest virtual machine from a host computer to the target computing device; and send an IP address associated with the target computing device. As another example, the one or more processors of the target computing device may be further configured to receive a receiver flow key associated with the host server; calculate a new receiver flow key based on the receive master key associated with the target computing device; and send the new receiver flow key to the external computer. Finally, as another example the one or more processors are further configured to encrypt data packets using the identified flow key when communicating with the external computer.

DETAILED DESCRIPTION

Figure 1:
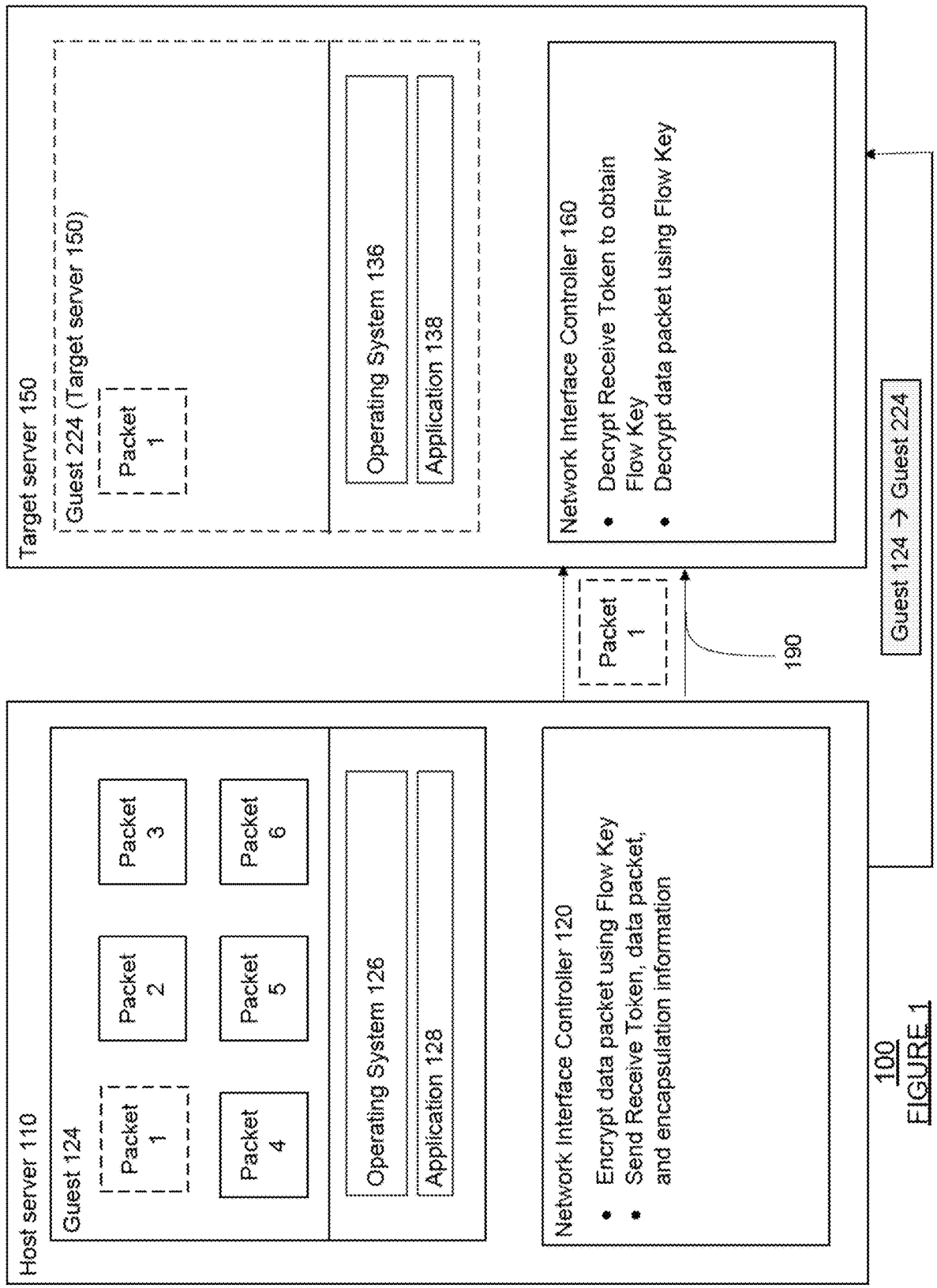
FIG. 1 is an example migration of a packet of a guest in accordance with aspects of the disclosure.

The technology relates generally to migrating guests of a virtual machine from a host server to a target server, while avoiding disruptions in connectivity and continuing to properly encrypt data. For example, a virtual machine on a host server may need to migrate to a target server. In this scenario, the hypervisor associated with the host server may collaborate between the guest server and the network interface controller (NIC), and ultimately with the target server.

The host server may use a flow key to encrypt and decrypt communications between the host server and target server. When the migrating guest is involved, the flow key may be encrypted by a receive master key, which may result in a receive token. As one example, the process may take place on a hypervisor of the host server. The hypervisor may then send the receive token (along with the encapsulated flow key therein) to the NIC of the host server. The NIC may then encrypt the data packet using the flow key, and send the encrypted data packet, receive token, and encapsulation information to the target server.

The host server may employ two different schemes of sending the receive tokens and data packets to the target server. In a first scheme a transaction table may be implemented, where tuples indexed by corresponding flow identifiers are stored. The tuples may store, for example, the receive token, in which case the tuples may be sent to the target server as is. In the second scheme, a Sender Token scheme may be implemented. In a Send Token scheme, the hypervisor, as one example, encrypts the receive token using a Sender Master Key, which results in a Send Token. The hypervisor may then send the Send Token to the NIC of the host server. The NIC may decrypt the Send Token, identify the flow key and receive token, use the flow key to encrypt the data packet, and then transmit everything, except the Send Token, to the target server.

According to another example, the hypervisor may copy a Send Token to a separate table every time a Send Token is retrieved from a read-only array. Generally, the NIC may receive the Send Tokens, which requires the NIC to access the Direct Access Memory ("DMA") of the hypervisor, which can take time. Therefore, by the hypervisor copying the Send Tokens when a request is made to the read-only array, the NIC may not have to access the DMA as often, thereby increasing performance.

Generation numbers may also be implemented in the read-only array. In this regard, the generation numbers may increase every time a send token is updated. Thus, when the hypervisor copies the send token, the hypervisor may also verify that the generation number has not changed after the copying of the send token. If the generation number is the same, then the hypervisor knows the send toke is the same. If the generation number is different, then the send token may have been updated, and thus the hypervisor may access the read-only array again.

Once the target server receives the receive tokens and data packets from the host server, the target server may decrypt the information. For instance, the target server may use its own Receive master key to decrypt the receive token and identify the flow key. Using the flow key the target server may then decrypt the data packet.

In addition to decrypting the receive tokens and data packets, the target server may calculate the flow keys. The use of flow keys is bi-directional, in that flow keys are used to send data and to receive data. Thus, for sending data, the flow key of the migrating guest does not need to change, since the flow keys associated with external computing devices are the same. However, for receiving data the flow key of the migrating guest may need to change because the location of the guest is no longer at the location of the host server, but the target server. Thus, this receiving flow key should be recalculated to conform to the target server, and then be sent to the external computing devices.

A system administrator may decide to migrate a live virtual machine to another server without delaying or pausing traffic. This may be necessary, for example, to reboot a host server, update a host server, or load balance the virtual machines for efficiency purposes.

Example 100 of FIG. 1 depicts a high-level view of guest 124 migrating from host server 110 to target server 150. Although guest 124 maintains the same operations and functionalities when migration is complete, FIG. 1 depicts guest 124 as becoming guest 224 in order to distinguish between its operation on the host server and its operation on the target server. Thus, when guest 124 begins migrating to target server 150, guest 124 effectively becomes guest 224 on target server 150.

As shown in example 100 of FIG. 1, guest 124 has operating system 126 and application 128 which operate on guest 124. The operating system 126 and application 128 may perform particular functions and handle certain processing tasks. In addition, each guest is not limited to host server 110, but may be implemented across multiple servers (not shown) for more efficient processing.

Host server 110 and target server 150 can be at various nodes of network 190 and capable of directly and indirectly communicating with other nodes of network 190. Although only a couple computing devices are depicted in FIG. 1, it should be appreciated that a typical system can include a large number of connected computing devices, with each different computing device being at a different node of the network 190. The network 190 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Data packets associated with guest 124 may be transferred from host server 110 to target server 150. When all of the data packets of guest 124 are transferred to target server 150, then guest 224 is fully developed and migration of guest 124 is complete. For example, Packet 1 of FIG. 1 illustrates the transfer of one data packet from host server 110 to target server 150. As discussed in more detail below, Network Interface Controller ("NIC") 120 may encrypt the data packet using a flow key and then send the data packet along with other information to target server 150. Once data Packets 1-6 are transferred to target server 150, migration is complete. Accordingly, guest operating system 136 and application 138 may run on the target server 150. While only a few data packets are shown here, it should be understood that significantly more data packets may be transferred before migration is complete.

Figure 2:
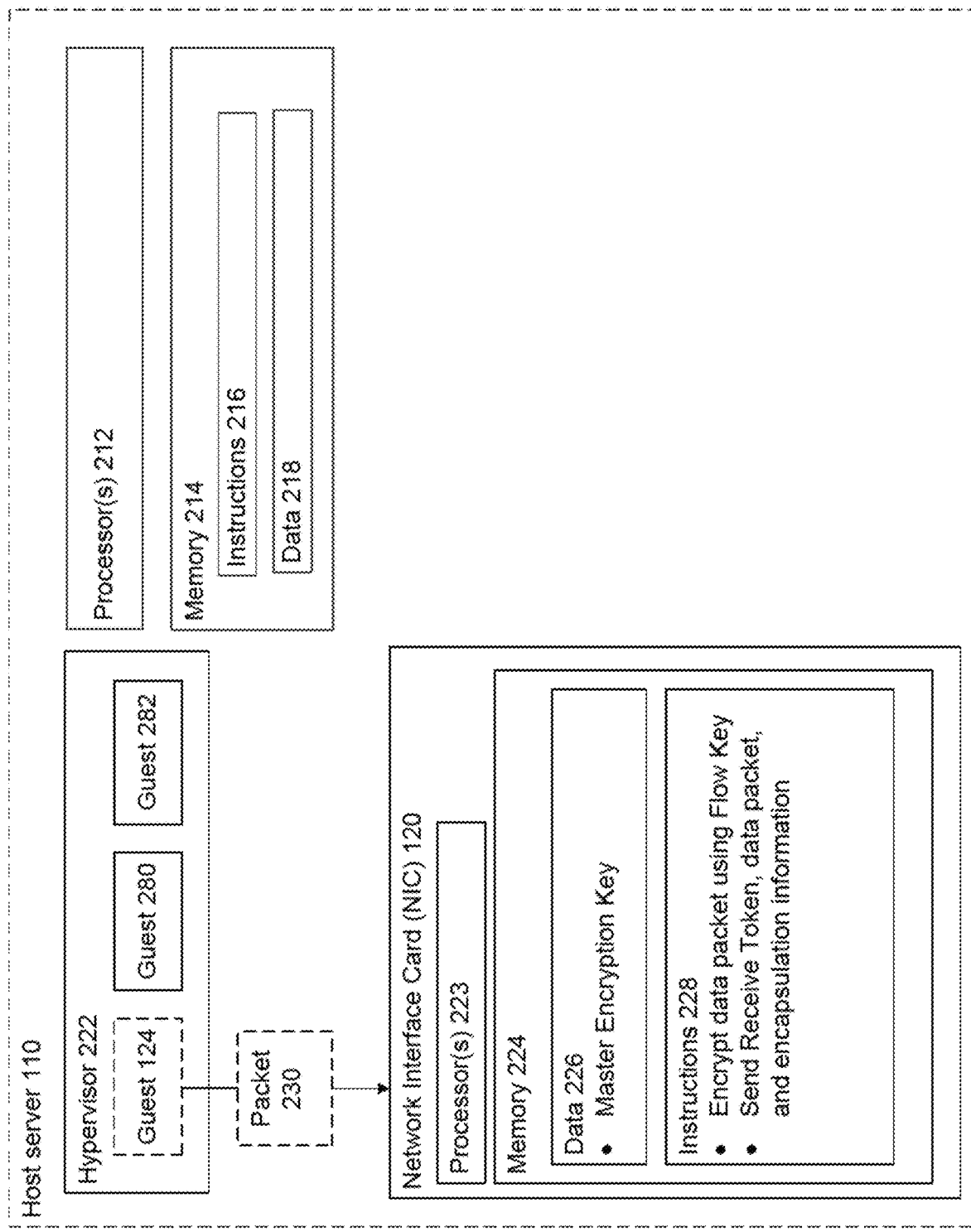
FIG. 2 is a block diagram of a Network Interface Controller ("NIC") residing on host server in accordance with aspects of the disclosure.

FIG. 2 illustrates an example system 200 in which the features described above may be implemented. It should not be considered as limiting the scope of the disclosures or usefulness of the features described herein. As shown, host server 110 includes one or more processors 212, memory 214 including instructions 216 and data 218, and NIC 120. Host server 110 also includes hypervisor 222 with guest 124. While migration of only guest 124 is discussed, it should be understood that host server 110 may be operating multiple guests at any time, and the same principles may be applied to migration of such guests. For example, guests 280 and 282 may also be running on the host 110.

Memory 214 may store information that is accessible by the processors 212, including the instructions 216 that may be executed by processor 212 and the data 218. The memory 214 may be of any type of memory operative to store information accessible by the processors 212 including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The systems and methods herein may include different combinations of the foregoing, whereby different portions of the instructions and data are stored on different types of media.

The instructions 216 may be any set of instructions to be executed directly (such as machine code) or indirectly (such as scripts) by the processors 212. For example, the instructions 216 may be stored as computer code on the computer-readable medium. The instructions 216 may be stored in object code format for direct processing by the processors 212 or in any other computer language including scripts or collections of independent source code modules that are interpreted on demand or compiled in advance.

The data 218 may be retrieved, stored or modified by the processors 212 in accordance with the instructions 216. For instance, although the system and method is not limited by any particular data structure, the data 218 may be stored in computer registers, in a relational database as a table having a plurality of different fields and records, extensible markup language ("XML") documents or flat files. The data may also be formatted in any computer-readable format.

The one or more processors 212 can be any conventional processor, such as a commercially available CPU. Alternatively, the processor can be a dedicated component such as an ASIC or other hardware-based processor. Although not necessary, the host server 110 may include specialized hardware components to perform specific computing processes, such as decoding video, matching image frames with images, distorting videos, encoding distorted videos, etc. faster or more efficiently. As another example, the one or more processors 212 may be responsible for handling basic system instructions 216 including running applications, handling calculations and computations, and processing inputs from devices such as a keyboard, mouse, microphone, etc. The processors may receive queries from computing devices (not shown) and process those queries, for example, by accessing memory 214, retrieving the queried information, and sending the information to the requesting computing device.

Host server 110 may utilize Ethernet cards or network adapters to connect to network 190, such as NIC 120. NIC 120 may be responsible for sending data packets to and receiving data packets from another server, such as from Host server 110 and Target server 150. NIC 120 may also be capable of encrypting data packets before sending and decrypting data packets after receiving, such as by using public and private keys.

In this regard, although FIG. 2 functionally illustrates the processors, memory, guest virtual machines and other elements of host server 110 as being within the same block, the processors, computer, computing device, or memory can actually comprise multiple processors, computers, computing devices, or memories that may or may not be stored within the same physical housing. For example, the memory can be a hard drive or other storage media located in a housing different from that of host server 110. Accordingly, references to a processor, computer, computing device, or memory will be understood to include references to a collection of processors, computers, computing devices, or memories that may or may not operate in parallel. For example, the host server 110 may include server computing devices operating as a load-balanced server farm. And although some functions described below are indicated as taking place on a single computing device having a single processor, various aspects of the subject matter described herein can be implemented by a plurality of computing devices, for example, communicating information over network 190.

FIG. 2 illustrates an encryption scheme implemented when transferring flow keys and data packets 230 from the host server 110 to a target server. In this regard, data packets associated with guest 124 are sent to NIC 120 (or other network adapter) of host server 110 so the NIC can encrypt the data packets and send information to the target, as discussed in more detail below. As shown in example 200 of FIG. 2, NIC 120 includes one or more processors 223 and memory 224 including data 226 and instructions 228. The processor 223, memory 224 including data 226 and instructions 228 may be similar to processors 212, memory 214, instructions 316, and data 218 of host server 110 as described above with respect to FIG. 1. Processors 223 may also be responsible for encrypting and decrypting data packets and flow keys in addition to sending and receiving data packets and flow keys.

The flow keys may be implemented as part of an encryption scheme between the host server and target server. For example, as shown in example 200 of FIG. 2 a data packet may be sent from the hypervisor of host server 110 to NIC 120. In this scenario, the NIC 120 may encrypt a Flow Key using a Receive Master Key associated with the target server, which may generate a Receive Token. Thus, the Receiver Token may be calculated according to the following formula: {Flow Key}Receive Master Key=Receive Token. Accordingly, the Receive Token is the Flow Key in encrypted form. The NIC of the target server 150 knows the Receive Master Key, and is thus capable of decrypting the Receive Token to obtain the flow key, aspects of which will be discussed further below.

Figure 3:
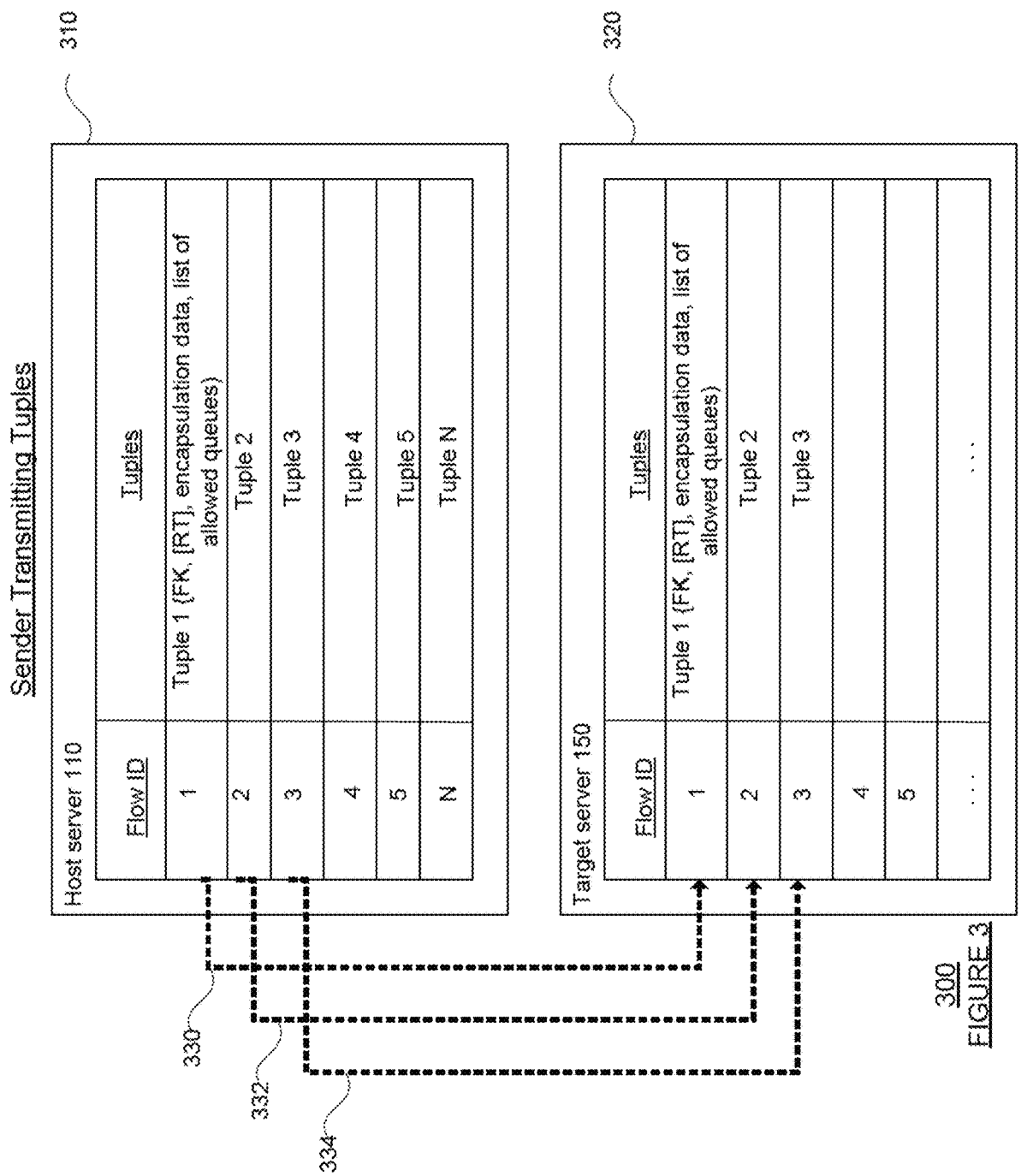
FIG. 3 is an example of tuples being transferred from the NIC of a host server to the NIC of the target server in accordance with aspects of the disclosure.

As a first approach to sending Receive Tokens, flow keys, and data packets, a Transaction Table may be implemented. FIG. 3 illustrates example Transaction Tables 310 and 320. The Transaction Tables may be implemented to send the multiple Receive Tokens and data packets to the target server. The transaction table may be implemented, for example, on the NIC of the host server, but managed by the hypervisor. As another example, the Transaction Table may be managed by the kernel of host server 110. The host server kernel, for instance, may manage the transfer of the data packets by utilizing the Transaction Table.

As shown in FIG. 3, the Transaction Table 310 includes Flow IDs and tuples. Each tuple is indexed by a corresponding Flow ID. As shown in the tuple associated with Flow ID 1, each tuple is comprised as follows: {Flow Key, Receive Token, [encapsulated information], [list of allowed queues]}. It should be noted that the tuples discussed herein include a Receive Token for the purposes of migration, but in situations not including migration, a Receive Token is unnecessary and may not be present. A similar tuple formation as in Tuple 1 applies to Tuple 2 through Tuple N and their corresponding Flow IDs.

According to one example, each tuple set may be sent from the host server to the target server. For instance, as illustrated by arrows 330, 332, and 334, Tuples 1, 2, and 3 transfer from host server 110 to target server 150. However, the corresponding Flow IDs associated with each tuple do not transfer. When the target server receives the tuples, each received tuple may be stored using a new corresponding Flow ID created by the target server.

Figure 4:
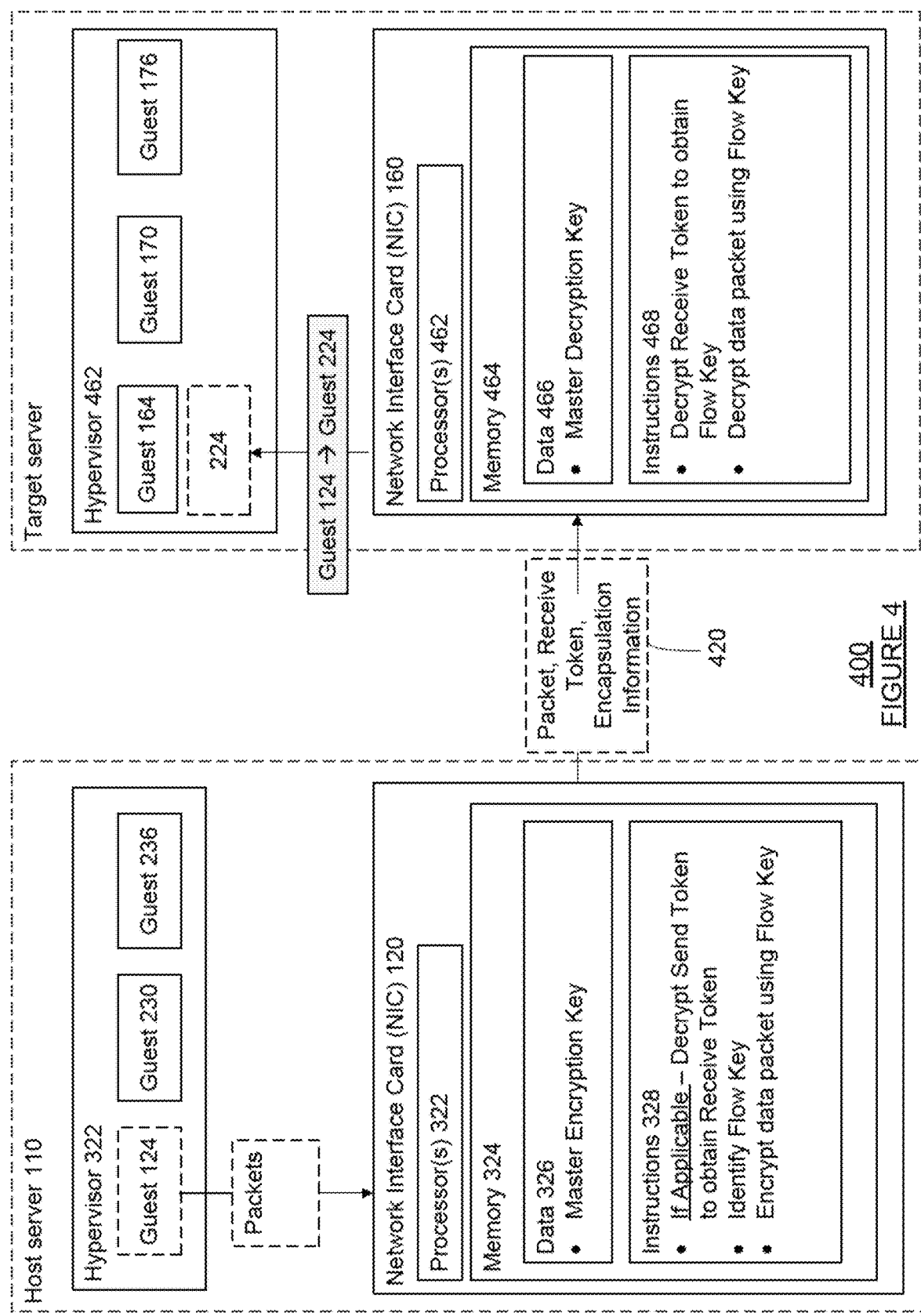
FIG. 4 is an example Send Token scheme used to transmit data packets from the host server to the target server in accordance with aspects of the disclosure.

In a second approach to sending the Receive Token and data packets, a Send Token scheme may be implemented. FIG. 4 illustrates the host server 110 sending data and information to target server 150. In this regard, target server 150 contains one or more processors and memory that includes data and instructions (not shown). The processors, memory, data, and instructions of the target server may function similarly as described above with regard to the processors 212, memory 214, instructions 216, and data 218 of host server 110. In addition, NIC 160 may be one example of a network adapter which sends and receives data packets, such as to host server 110 or a separate computing device (not shown). Guest 224 may also operate similarly as the guests described with respect to host server 110, including an operating system and application. The hypervisor 462 may also be responsible for interoperating guests, such as guest 224, with the various components and hardware of target server 150, such as the processors and memory. As another example, the hypervisor may refer to any code responsible for running, managing, or migrating the guest virtual machines.

In the example of FIG. 4, the Send Token scheme is implemented in transferring the Receive Token, flow key and data packet to the NIC. The Send Token operation may be used to encrypt the Receive Token, along with the encapsulated flow key, before sending the Receive Token to the NIC. Thus, the Send Token scheme allows for the transfer of data packets and information to the NIC that is local to the host server. The Send Token scheme may be set up, for example, on the hypervisor or the kernel of the host server. The Send Token operation may then be performed by either the kernel of the host server, the kernel of the guest, or the code associated with the guest. For example, guest 124 may have software code that performs the Send Token scheme.

Unlike the Transaction Table described above, the Send Token scheme may encapsulate the Receive Token and Flow Key by using a Send Master Key. In this regard, the Receive Token may be encrypted in addition to the Flow Key, but using the Send Master Key. For example, the following Send Token formula may be implemented: Send Token={Flow Key, Receive Token, [list of allowed queues], [encapsulation information]Send Master Key}. The generated Send Token may then be sent to the NIC of the host server. As shown in example 400 of FIG. 4, the NIC 120 then decrypts the Send Token to obtain the Receive Token.

There may be advantages in using the Send Token and Transaction Table schemes. For example, the Send Token scheme may allow for the transfer of more data, but the transfer of the information may be slower than the Transaction Table scheme. On the other hand, although the Transaction Table scheme may allow for a quicker transfer of data, there may also be less data transferred because the transaction table has a limited size as compared to the send tokens. Thus, the scheme that is employed may depend on the preference of the administrators of the overall system.

Each data packet may be encrypted by the host server NIC as well. The NIC may encrypt the data packet by using the Flow Key. Thus, the formula for encrypting the data packet on the NIC may be as follows: Packet Cryptotext={Packet Plaintext}Flow Key. The process of the target server decrypting the encrypted packet and Receive Token is discussed in more detail below.

In the example of FIG. 4, host server 110 sends the generated Receive Token and encrypted data packets to target server 150. In this scenario, information 420 includes a data packet, Receive Token, and Encapsulation Information. The encapsulation information may include, for example, the source location and destination information. It should be noted that, if the Send Token scheme is implemented (as opposed to the Transaction Table), the Send Token stays local to the host server; thus, neither the Send Token nor Send Master Key is transferred to the target server. However, once the NIC of the host server is ready to send the gathered information, both schemes send the same tuple of information to the target server. Target server 150 includes NIC 160 which includes one or more processors 462, memory 464, data 466, and instructions 468, all of which may operate similarly as discussed above with respect to processors 223, memory 224, instructions 226, and data 228 of NIC 120.

When target server 150 receives information 420, the target server decrypts the Receive Token as illustrated in FIG. 4. NIC 160 of target server 150 may decrypt the Receive Token by using its own Receive Master Key. After the Receive Token is decrypted and the Flow Key is obtained, the NIC may then decrypt the data packet using the Flow Key, as the host server encrypted the data packet using the Flow Key. Once the packet payload is decrypted, the packet may be sent to the hypervisor, guest 224, or operating system associated with guest 224.

Referring back to the scenario where Flow IDs and tuples are used to transfer data from the host server to the target server, the target server may organize the received information. For instance, similar to the Transaction Table on the host server, the target server may generate a similar table that corresponds to the Flow IDs and tuples of the host server. The Flow ID numbers may not be the same, but a similar scheme may be used, such as arranging the tuples so that each tuple corresponds to a particular Flow ID.

In the scenario where a Send Token scheme is utilized on the host server, a read-only array may be implemented. The read-only array may be implemented, for example, on the hypervisor or guest, and the Sending Software of the hypervisor, guest kernel, or guest user code may manage the read-only array. The Sending Software may be responsible for sending the Send Token to the NIC. As one example, there may be a request for data in a cell of the read-only array, unrelated to migration.

Figure 5:
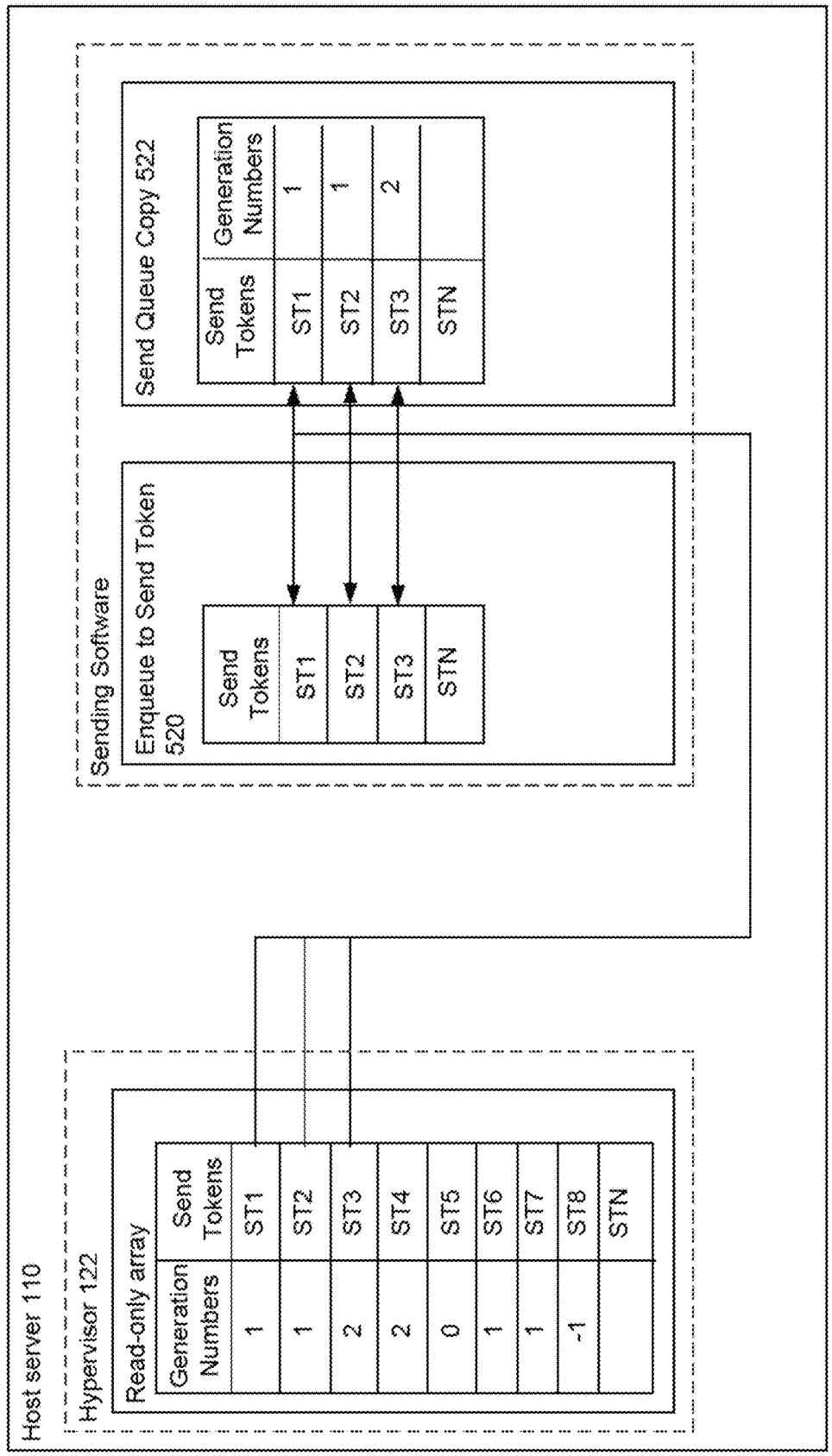
FIG. 5 is an example of copying enqueued packets with generation numbers in accordance with aspects of the disclosure.

FIG. 5 provides an example 500 of the hypervisor accessing the read-only array and loading it into its queue (i.e., Enqueue to Send Token 520). When this occurs, a copy is made into a separate queue (i.e., Send Queue Copy 522). The original request for the information may then travel to the NIC which will transmit the information to the appropriate computing device (not shown). When migration from the host server to the target server takes place, the NIC does not need to access the read-only array a second time, because the Send Token is already stored in the Sending Software, as shown in FIG. 5. The advantage of copying the Send Tokens in this situation reduces the latency for the NIC to retrieve the Send Tokens as opposed to accessing the DMA again.

Generation numbers may be stored in the read-only array to determine the reliability of the Send Token. For instance, since the time of the copy of the Send Token into the Send Queue Copy 522, the Send Token may have been updated. Thus, the Send Token stored in the Send Queue Copy 522 may not be the most recent version of the Send Token. As shown in FIG. 5, Generation Numbers that correspond to the Send Token are stored in the read-only array. In this regard, the Sending Software may check the Generation Number to determine whether or not there has been an update. Every time the hypervisor updates a Send Token, the hypervisor may update the Generation Number by a given value. In one example, the Generation Number may be increased by a value of 1. By way of example only, the Sending Software may check the Generation Number associated with a particular Send Token, such as ST1 of FIG. 5. The Sending Software may check the Generation Number prior to copying the Send Token, and then re-check the Generation Number after copying the Send Token. The Sending Software may store in memory the identified Generation Numbers after each check. If the Generation Number is different than the first check, then the Sending Software may re-try by retrieving the Send Token a second time and checking the Generation Number in a similar process.

The NIC is responsible for sending the data to the target server. For example, once the Send Token scheme discussed above is performed, the NIC may retrieve the Send Token from the Sending Software. As discussed above, the NIC may decrypt the Send Token to obtain the Receive Token, encrypt the data packet, and then send everything to the target server. The target server may then decrypt the Receive Token and data packet as discussed above.

The Send Tokens of the Host Server are updated to correspond to the Master Key of the target server. The update may occur, for instance, on the hypervisor of the target server. The update may occur during the brownout and/or blackout phase of the migration. As another example, the Send Token update may occur on the host or target servers as a way to expedite the process.

Figure 6:
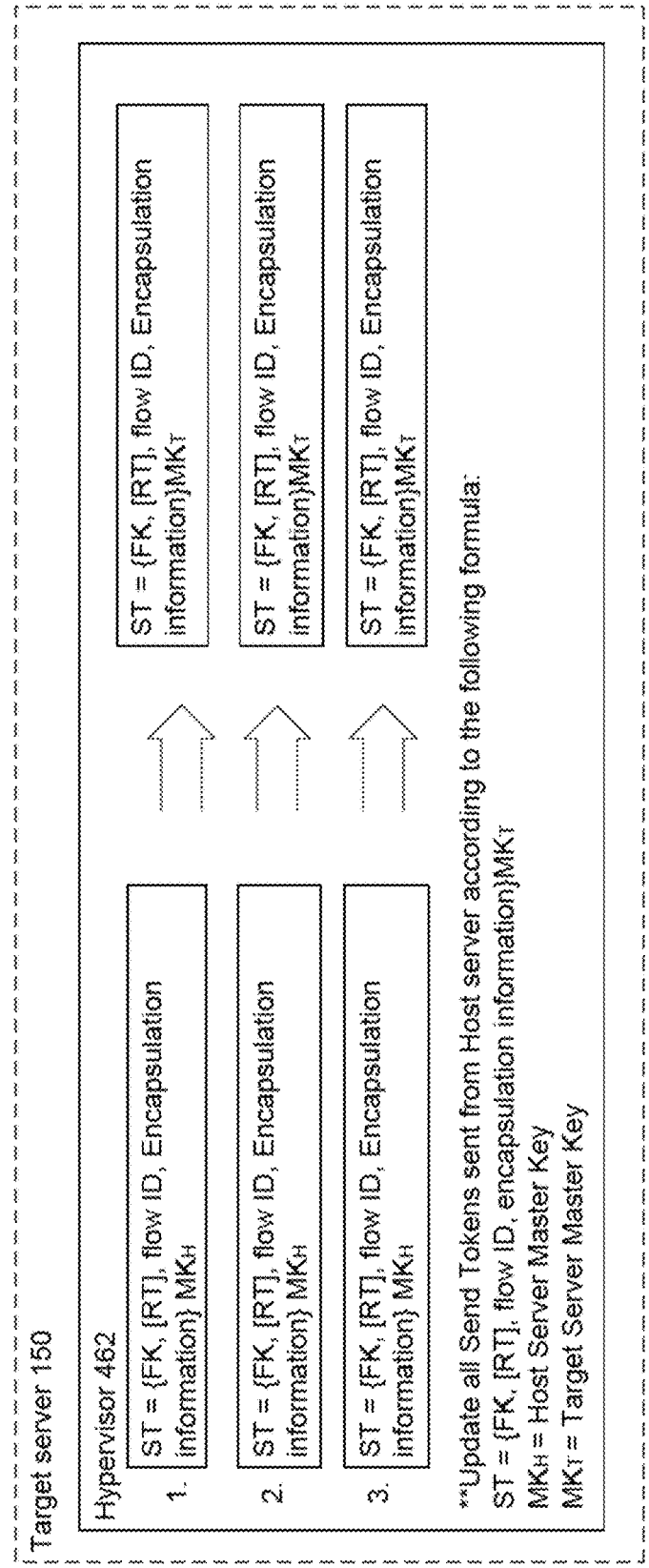
FIG. 6 is an example calculation to transform the master key of the host server to the master key of the target server in accordance with aspects of the disclosure.

FIG. 6 is an example 600 of the recalculation of the Send Token on hypervisor 462 of target server 150. In order to recalculate the Send Token using the Master Key of the target server, the following formula, as one example, may be implemented: Send Token={Flow Key, Receive Token, [encapsulated information]} Target Server Master Key. This or a similar formula should be applied to each Send Token that the target server receives.

Before, after or during the update of the Send Tokens on the target server, external computing devices may be updated as well. This may occur during the brownout or blackout phases. For example, the external computing devices may still be communicating with the guest on the host server, but the guest has migrated to the target server. Thus, the information that the external computing devices were using to communicate with the guest on the host server should change to correspond to the new host server (i.e., the target server).

Figure 7:
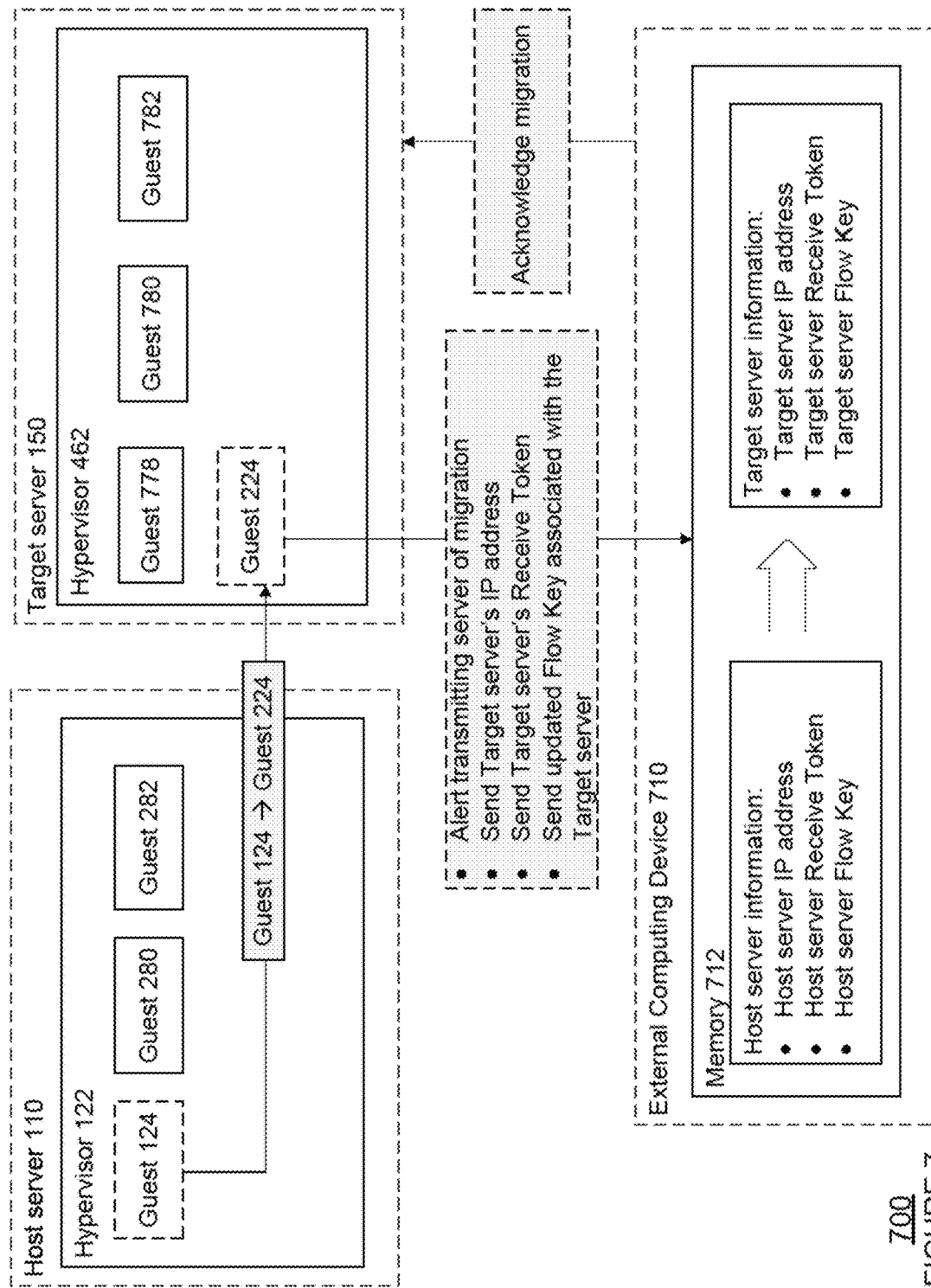
FIG. 7 is an example of the target server notifying a transmitting server of the migration in accordance with aspects of the disclosure.

In example 700 of FIG. 7, target server 150 alerts external computing device 710 of the migration. In addition, target server 150 sends External Computing Device 710 the IP address of the target server and the Receive Token of the target server, and the updated Flow Key of the target server. The transmittal of the IP address will allow the external computing device 710 to know the location of the target server 150. For instance, as shown in FIG. 7 the external computing device 710 may update memory 712 by replacing the host server information with the target server information. The Receive Token and Flow Key will allow the external computing device to encrypt and decrypt data with the target server. For example, the external computing device 710 may use the updated Flow Key to encrypt data packets that it sends to the target server. In addition, as shown in FIG. 7 the external computing device 710 sends an acknowledgement of the migration to target server 150. The target server may alert all external computing devices associated with Send Tokens that the target server has received.

According to another example, the Flow Keys may adapt to the target server like the Send Token discussed above. For instance, Flow Keys are bi-directional, thereby requiring two flow keys. One direction is when the guest sends data, and a second direction is when the guest receives data. In this regard, if the Flow Key is associated with the migrating sender then the Flow Key may not need to change. Conversely, if the Flow Key is associated with the migrating receiver then the Flow Key may need to change. As one example, the Flow Key associated with a migrating sender can continue using the Flow Key of the external computing device, thereby permitting successful communication. Successful communication occurs because the target server can use the Flow Key of the external computing device when sending the data. Thus, the external computing device does not change, even with a guest migrating to a different server. In another example, however, the Flow Key associated with a migrating receiver requires the external computing device to learn the Flow Key of the target server. This is so the external computing device can encrypt the packet using the Flow Key of the correct server. For this to work the migrating receiver may send the Flow Key associated with the target server to the external computing device that wishes to communicate with the target server. The external computing device may then generate a Receive Token using the Flow Key of the target server.

The host server may continue to receive data packets from external computing devices. For example, this may occur during the blackout phase, in which the external computing device is unaware of the migration. The ability for the host server to transmit the stray packets may be disabled because of the blackout phase. In this scenario, the host server may create a new in-hypervisor queue for the stray data packets, in which the hypervisor may still encrypt the data packets before being placed in the enqueue. The enqueued packets may be sent to the migrating guest (e.g., guest 124). The stray packets may then be sent to the target server in the same manner as described above (e.g., the Send Token scheme or through the Transaction Table).

Figure 8:
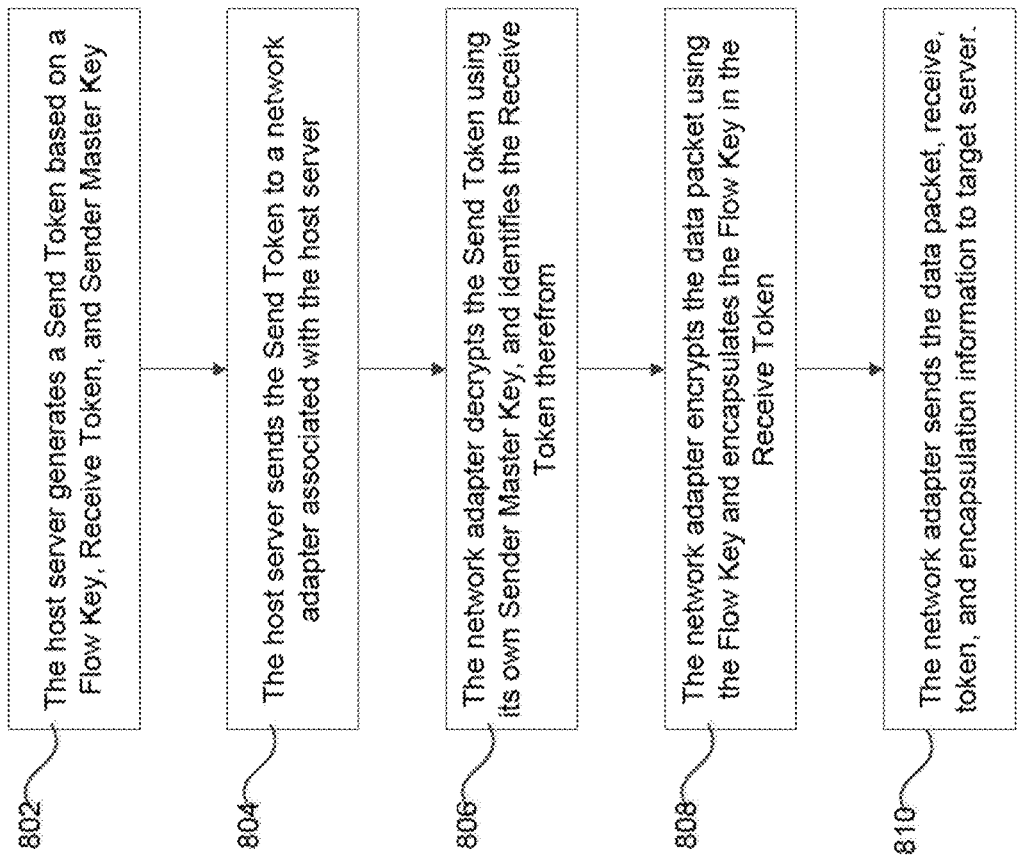
FIG. 8 is a flow diagram illustrating an aspect of the disclosure.

Example 800 of FIG. 8 depicts an example flow diagram of an aspect of the above disclosure. For example, at block 802 the host server generates a Send Token based on a Flow Key, Receive Token, and Sender Master Key. The host server then sends the Send Token to a network adapter associated with the host server at block 804. The network adapter decrypts the Send Token using its own Sender Master Key, and identifies the Receive Token as a result at block 806. At block 808, the network adapter encrypts the data packet using the Flow Key and encapsulates the Flow Key in the Receive Token. The network adapter then sends the data packet, Receive Token, and encapsulation information to a target server at block 810.

The subject matter described herein is advantageous in that is provides a system and method for the live migration of a guest virtual machine from one server to another. Much of the above disclosure may take place during a brownout phase, so the migrating guest on the host server can still operate during the migration process. Another advantage includes the reduced latency involved when the NIC of the host server retrieves the Send Tokens from the copied queue, as opposed to accessing the read-only array via the Direct Memory Access.

As these and other variations and combinations of the features discussed above can be utilized without departing from the subject matter as defined by the claims, the foregoing description of embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of the many possible aspects.

The invention claimed is:

1. A method of migrating a guest of a virtual machine from a host computing device to a target computing device, the method comprising:
at the host computing device:
preparing, using one or more processors, to send information to a target computing device, the information including at least a flow key and a first data packet of a plurality of data packets of the guest;
generating, using the one or more processors, a receive token by encrypting the flow key using a receive master key;
encrypting the first data packet using the flow key;
generating a send token by encrypting the receive master key, flow key, and first data packet using a send master key, wherein the send token encapsulates the receive master key, the flow key, and the first data packet;
sending the send token to a network adapter; and
decrypting, on the network adapter, the send token to identify the receive master key, flow key, and the first data packet;
encrypting, on the network adapter, the first data packet using the flow key, and
sending, by the network adapter, the encrypted first data packet and the receive token to the target computing device;
at the target computing device:
receiving the encrypted first data packet and the receive token;
decrypting the receive token using the receive master key;
identifying the flow key in response to decrypting the receive token; and
decrypting the first data packet using the identified flow key; and
completing migration of the guest to the target computing device by repeating the preceding steps for remaining data packets of the plurality of data packets of the guest.

2. The method of claim 1, further comprising:
sending the information to the network adapter;
storing, on the network adapter, the information and the receive token as a tuple, the tuple corresponding to a flow ID; and
sending the receive token, flow key, first data packet, and encapsulation information as a tuple to the target computing device.

3. The method of claim 1, further comprising:
retrieving a send token from a first table;
copying the retrieved send token in a second table; and
sending the copied send token to the network adapter.

4. The method of claim 3, wherein the first and second tables include a reliability number, the reliability number corresponding to the send token, and the method further comprising:
updating the send token associated with the first table; and
incrementing the reliability number associated with the send token of the first table in response to the update.

5. The method of claim 4, further comprising:
checking the reliability number corresponding to the send token in the first table before copying the send token in a second table;
storing the reliability number in the second table;
verifying, after copying the send token, the reliability number corresponding to the send token is the same in the first and second tables; and
when the reliability number is not the same, retrieving the send token again.

6. A system for migrating a guest of a virtual machine from a host computing device to a target computing device, the system comprising:

the host computing device, the host computing device comprising:

a network adapter;

at least one memory storing encryption keys; and one or more processors in communication with the memory, the one or more processors configured to:

prepare information for sending to the target computing device the information including at least a flow key and a first data packet of a plurality of data packets of the guest;

generate a receive token by encrypting the flow key using a receive master key;

encrypt the first data packet using the flow key;

generate a send token by encrypting the receive master key, the flow key, and the first data packet using a send master key, wherein the send token encapsulates the receive master key, the flow key, and the first data packet;

send the send token to the network adapter; and decrypt, on the network adapter, the send token to identify the receive master key, flow key, and the first data packet;

encrypt, on the network adapter, the first data packet using the flow key, and send the encrypted first data packet and the receive token to the target computing device; and repeat the preceding steps for remaining data packets of the plurality of data packets to complete migration of the guest to the target computing device.

7. The system of claim 6, wherein the one or more processors are further configured to:

send the information to the network adapter;

store, on the network adapter, the information and the receive token as a tuple, the tuple corresponding to a flow ID; and send the receive token, flow key, first data packet, and encapsulation information as a tuple to the target computing device.

8. The system of claim 6, wherein the one or more processors are further configured to:

at least one memory storing encryption send the generate a send token by encrypting the receive master key, flow key, and first data packet using a send master key, wherein the send token encapsulates the receive master key, flow key, and first data packet;

send the send token to the network adapter; and decrypt, on the network adapter, the receive master key, flow key, and data packet.

9. The system of claim 8, wherein the one or more processors are further configured to:

retrieve a send token from a first table;

copy the retrieved send token in a second table; and send the copied send token to the network adapter.

10. The system of claim of claim 9, wherein the first and second tables include a reliability number, the reliability number corresponding to the send token, and the one or more processors are further configured to:

update the send token associated with the first table; and increment the reliability number associated with the send token of the first table in response to the update.

11. The system of claim 10, wherein the one or more processors are further configured to:

check the reliability number corresponding to the send token in the first table before copying the send token in a second table;

store the reliability number in the second table;

verify, after copying the send token, the reliability number corresponding to the send token is the same in the first and second tables; and when the reliability number is not the same, retrieve the send token again.

12. The system of claim 11, wherein the one or more processors are further configured to send the copied send token to the network adapter when the reliability number is the same.

13. The method of claim 1, wherein the target computer device calculates the flow key, the flow key being one key of a bi-directional flow key pair for sending data to and receiving data from an external computer after migration.

* * * * *